(No Model.)
J. B. KING.
Process of Cutting Polished Glass.
No. 237,112. Patented Feb. 1, 1881.
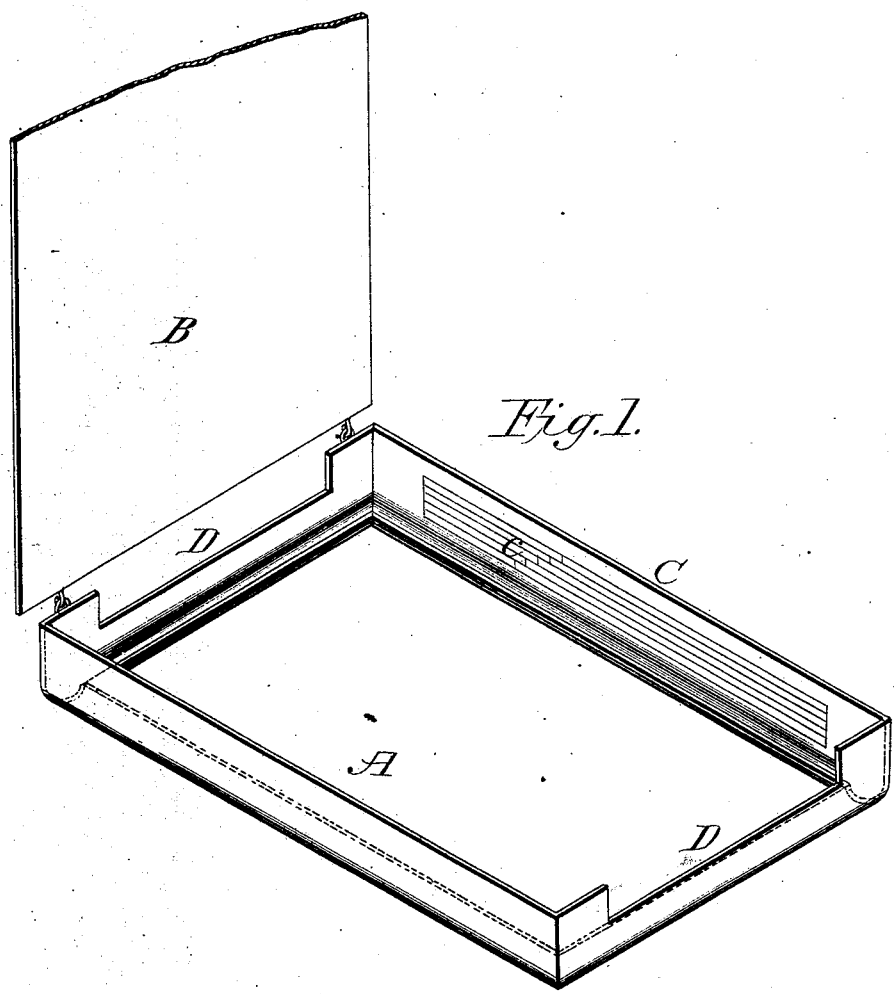
Witnesses:
Denis R. O'Sullivan
George H. Stracht
Inventor:
John B. King

UNITED STATES PATENT OFFICE.

JOHN B. KING, OF BROOKLYN, NEW YORK.

PROCESS OF CUTTING POLISHED GLASS.

SPECIFICATION forming part of Letters Patent No. 237,112, dated February 1, 1881.

Application filed July 27, 1880. (No model.)

*To all whom it may concern:*

Be it known that I, JOHN B. KING, a citizen of the United States, residing at the city of Brooklyn, in the county of Kings and State of New York, have invented certain new and useful Improvements in the Process of Decorative Cutting of Polished Glass; and I do hereby declare that the following is a full, clear, and exact description of the invention, which will enable others skilled in the art to which it appertains to make and use the same.

In the drawings, representing the frame in which the glass is placed during a part of the process, A represents the frame proper; B, the lid or sliding cover; C, the sides of the frame on which is marked the graduated scale $C^2$, and D is the opening or aperture through which the cold air is admitted.

Heretofore polished glass has been decoratively cut by applying emery-wheels thereto, and the best mechanical skill was requisite to direct the operation. Glass has also been cut by the application of gelatine; but in such cases the polished surface had to be completely effaced by means of a sand-blast, powerful and tedious rubbing with sandstone or grit; or in the absence of these the polished surface had to be coated completely with gum and flux, (pulverized glass,) then placed in a kiln and fired until the gum and flux had become burned in. The surface so prepared was then coated with gelatine and placed in a hot room until contraction set in, thereby removing the gelatine and forcing the rough glass to scale off.

The objects of my invention are thoroughly to cut polished glass to any depth, according to any design or pattern, without destroying the polished surface, and without the use of sandstone-rubbing, gum-flux coating, and kiln-burning, for by my process any artistic design or pattern may be cut into polished glass, leaving the uncut parts of the polished glass in relief, and the design or pattern may be produced or duplicated as often as required.

Another feature of my invention, besides the reproducing of the design, is a uniformity of cutting never before obtained by any coating process and the preventing of the warping and breaking of the glass. Again, glass which would be injured by the kiln process can be submitted to my process without being in the slighest degree injured thereby either in color or otherwise.

To carry my invention into effect I take any glutinous substance—for instance, common glue—and boil said gluten until it has arrived at a fluid consistency. Then I take a piece of fine emery-cloth and immerse it in such fluid, either hot or chilled, and apply it to the polished surface, gently rubbing it until it becomes "tacky" or "set." By this means I displace the film of oxygen produced on the polished surface by atmospheric air, still preserving the uncut polished surface on the glass. I then coat to any desired thickness with the same solution or size, according to the required depth of the cutting, in order to produce uniformity of design. For instance, 1 place a plate of polished glass so prepared in a frame or casing constructed with sides, leaving the top and bottom open. The under edge of this frame turns inward and upward, so as to form a continuous channel around the inner sides of the frame. On the inner sides of this frame is a measuring-scale, by means of which the coating of glue may be regulated, thereby guaranteeing the continuous repetition of the design or pattern. On the inner edges, which form a continuous channel, rests the plate of glass. On two opposite sides of the frame an aperture is made from the top edge. A lid or slide covers the whole frame on top, making a continuous passage of cold air. When the coating of the glass is made to stand at 70° Fahrenheit I place the plate, glued side downward, in the frame, close the lid on the top, and suspend the whole in a room or chamber with a heated temperature of from 70° to 110° Fahrenheit. The side apertures are then connected with a ventilator outside the heated room, and while the frame and coated side of the glass are entirely exposed to the heat a continuous current of cold air is allowed to pass through the hollow frame over the unglued side of the glass. By this application of heat and cold more than fifty per cent. of time is saved in the manipulation of the work and ninety-five per cent. of breakage is avoided. The cold air passing over the glass tends to contract the same, while the heat coming on the glued side expands the glue, thereby producing mechanical combustion or cracking and repulsion of the glue and glass, whereby the glue, in separating from the glass, takes with it particles of glass requisite to complete the design or pattern.

In the application I have particularly described common glue, because it is usually ready at hand or can be so easily procured, and needs only the application of warm water to dissolve it; but any glutinous cereal may be easily made to suit the same purpose.

By all previous methods of cutting glass by the coating process the glass had to be completely ground or the polish completely destroyed, and when coated with gelatine was submitted to a high-heated temperature, entirely excluding cold air, thus causing the glass to warp with the contraction of the gelatine, thereby making the operation tedious, and in most cases breaking the glass; nor by any former process have they been able to guarantee uniformity of design or duplication of patterns previously cut; nor were they able to cut all kinds of glass without destroying either its color or otherwise injuring it.

A striking advantage of my process is that any polished-glass figure or any polished-glass or porcelain vessel of any size or shape can be decoratively cut with any design, such as a rose or monogram or other artistic design or pattern, still leaving the uncut portions of the glass or porcelain—to wit, the portions not covered or included in the pattern—with their former polish, and such design or pattern can be duplicated as often as required.

When the object to be cut has been operated upon it is free from all sand, which was a striking defect of the former process of submitting the glass to the sand-blast and kiln-burning.

Having fully described my invention, what I desire to claim and secure by Letters Patent is—

1. The decorative cutting of polished glass without destroying the polished surface or the color by the combined action of hot and cold air on the polished glass when coated with gluten or gelatine, as described.

2. The preserving of the glass from warping and blistering by the application of emery-cloth, substantially as described, whereby exposure to intense heat is obviated.

3. The producing of uniformity of cutting of the glass and duplication of patterns by regulating the coating of gluten or gelatine, which is effected by the graduated scale on the inside of the frame, as described.

JOHN B. KING.

Witnesses:
DENNIS R. O'SULLIVAN,
GEORGE H. KRACHT.